United States Patent
Xu et al.

(10) Patent No.: US 10,076,771 B2
(45) Date of Patent: Sep. 18, 2018

(54) LINEAR VIBRATION MOTOR

(71) Applicants: Hongfu Xu, Shenzhen (CN); Zhilin Chai, Shenzhen (CN); Na Wu, Shenzhen (CN); Fanghua Ling, Shenzhen (CN)

(72) Inventors: Hongfu Xu, Shenzhen (CN); Zhilin Chai, Shenzhen (CN); Na Wu, Shenzhen (CN); Fanghua Ling, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 137 days.

(21) Appl. No.: 15/415,937

(22) Filed: Jan. 26, 2017

(65) Prior Publication Data
US 2018/0111163 A1    Apr. 26, 2018

(30) Foreign Application Priority Data

Oct. 25, 2016  (CN) .................... 2016 2 1163318 U

(51) Int. Cl.
*H02K 33/00* (2006.01)
*B06B 1/04* (2006.01)
*H02K 1/34* (2006.01)
*H02K 33/12* (2006.01)

(52) U.S. Cl.
CPC .............. *B06B 1/045* (2013.01); *H02K 1/34* (2013.01); *H02K 33/00* (2013.01); *H02K 33/12* (2013.01)

(58) Field of Classification Search
CPC ........ H02K 33/16; H02K 33/18; H02K 33/00; H02K 5/02; H02K 1/12
USPC .......................... 310/13–15, 25, 12.01–12.33
See application file for complete search history.

(56) References Cited

U.S. PATENT DOCUMENTS

| | | | |
|---|---|---|---|
| 8,269,379 B2* | 9/2012 | Dong | H02K 33/16 310/25 |
| 9,748,827 B2* | 8/2017 | Dong | H02K 33/16 |
| 9,935,535 B2* | 4/2018 | Guo | H02K 33/16 |
| 2013/0099600 A1* | 4/2013 | Park, II | B06B 1/045 310/15 |
| 2016/0226362 A1* | 8/2016 | Wang | H02K 33/16 |
| 2018/0111162 A1* | 4/2018 | Xu | B06B 1/045 |

* cited by examiner

*Primary Examiner* — Thanh Lam
(74) *Attorney, Agent, or Firm* — Na Xu; IPro, PLLC

(57) ABSTRACT

A linear vibration motor includes a housing; an elastic connecting part connected with the housing; a vibrator supported by the elastic connecting part and suspended in the housing; a first permanent magnet positioned by an internal wall of the housing; and a second permanent magnet assembled with the vibrator and facing the first permanent magnet. The first permanent magnet and the second permanent magnet are separated from each other. The first permanent magnet and the second permanent magnet are such configured that the same polarities of the first and second permanent face to each other for producing a repulsive force between the vibrator and the housing.

6 Claims, 2 Drawing Sheets

LINEAR VIBRATION MOTOR

FIELD OF THE PRESENT DISCLOSURE

The present disclosure relates to the technical field of vibration motors, especially relates to a linear vibration motor.

DESCRIPTION OF RELATED ART

Along with the development of electronic technology, portable consumer electronics are more and more popular among people, such as mobile phone, palmtop video game player, palmtop multimedia entertainment devices and so on. These electronic products generally adopt linear vibration motor for system feedback.

The housing and the vibrator of the linear vibration motor use foam as damping material at present. In the vibration process of the vibrator, although the foam has the damping effect of vibration, the damping foam is not stable and is deformed easily, and assembling process is complicated and assembling consistency is not ideal.

Thereof, it is necessary to disclose and provide an improved linear vibration motor to overcome the above-mentioned disadvantages.

BRIEF DESCRIPTION OF THE DRAWING

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
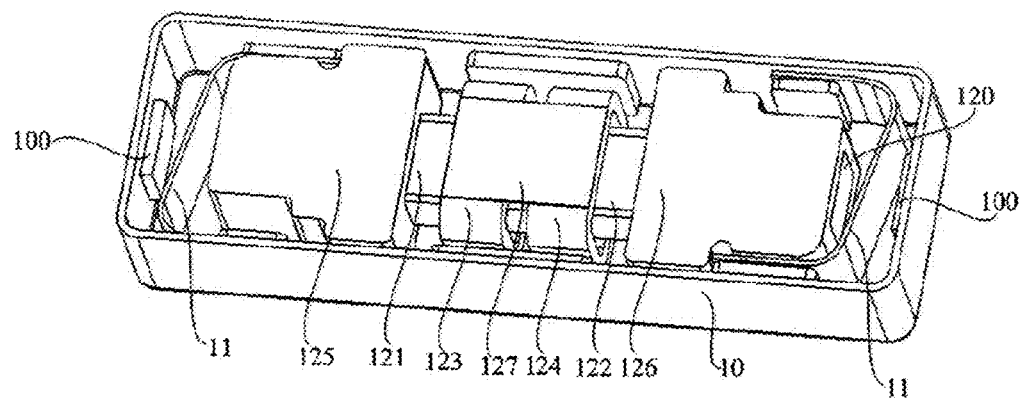
FIG. 1 is an illustration of a linear vibration motor in accordance with an exemplary embodiment of the present disclosure.
Figure 2:
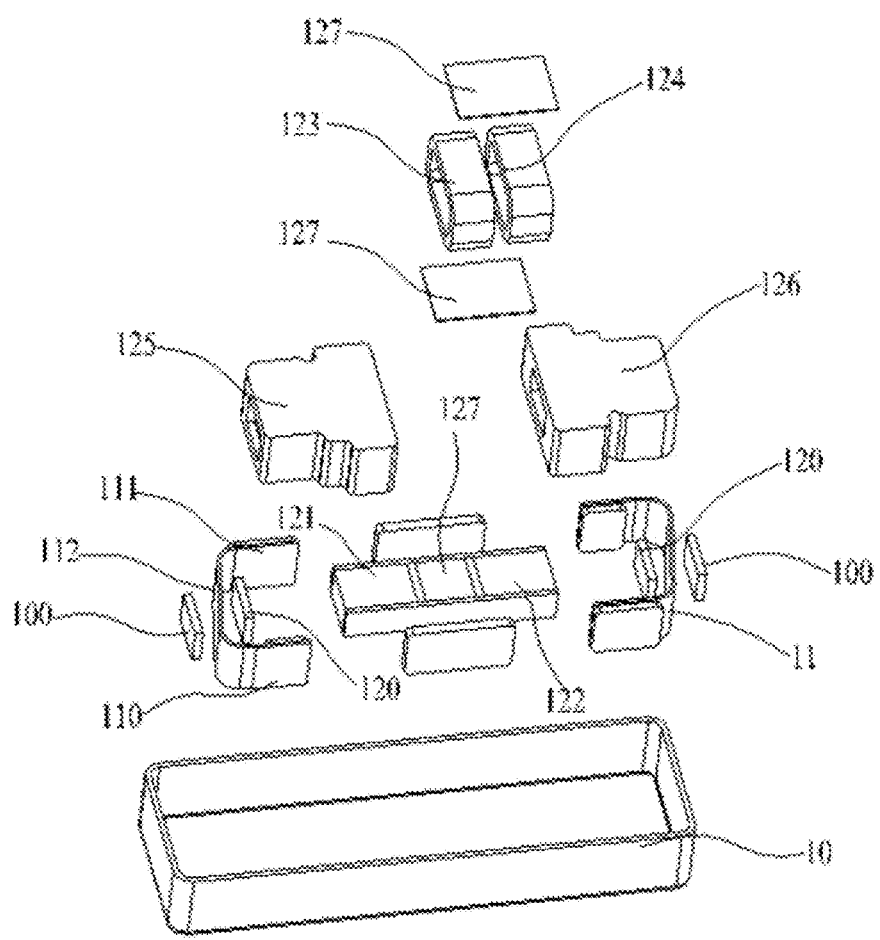
FIG. 2 is an exploded view of the linear vibration motor in FIG. 1.
Figure 3:
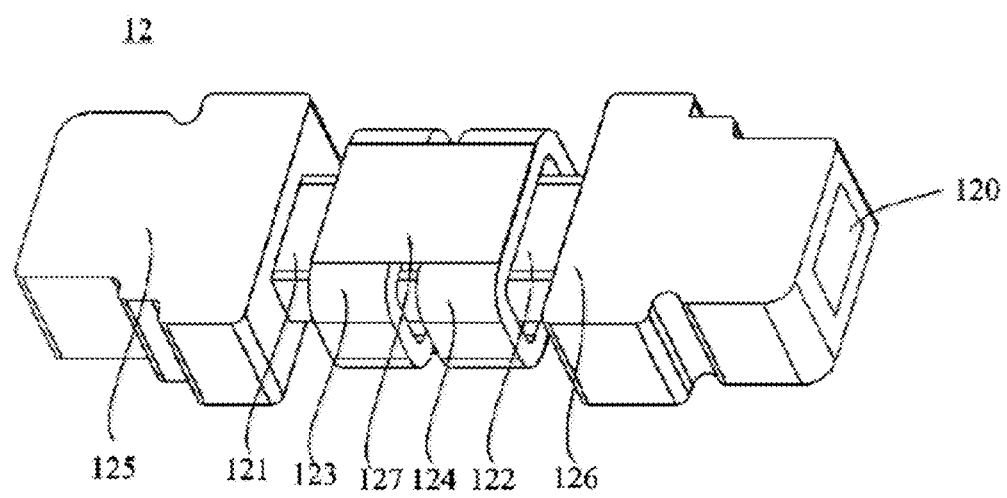
FIG. 3 is an illustration of a vibrator of the linear vibration motor in FIG. 2.

As shown in FIGS. 1-3, a linear vibration motor, includes a housing 10, an elastic connecting part 11 and a vibrator 12.

There are two elastic connecting parts 11, which are located respectively on both ends of the vibrator 12. The elastic connecting part 11 includes a first connecting portion 110, a second connecting portion 111 as well as a third connecting portion 112 which connects the first connecting portion 110 and the second connecting portion 111. The elastic connecting part 11 connects respectively the housing 10 and the vibrator 12 through the first connecting portion 110 and the second connecting portion 111. The third connecting portion 112 is separated respectively with the housing 10 and the vibrator 12. The vibrator 12 is suspended by the elastic connecting part 11 in the housing 10, in which, in order to increase the connecting strength between the elastic connecting part 11 to the housing 10 and the vibrator 12, a gasket can be installed on the surface of the first connecting portion 110 and/or the second connecting portion 111.

The internal wall of the housing 10 is installed with a first permanent magnet 100. The vibrator 12 is installed with a second permanent magnet 120 which face the first permanent magnet 100. The first permanent magnet 100 and the second permanent magnet 120 are separated. The magnetic pole of the first permanent magnet 100 and the magnetic pole of the second permanent magnet 120 facing the first permanent magnet 100 have the same polarity (N pole faces N pole, or S pole faces S pole). As same poles repulse each other, a repulsive force is created between the first permanent magnet 100 and the second permanent magnet 120, and a repulsive force is created between the vibrator 12 and the housing 10. The repulsive force can prevent the vibrator 12 in vibration to drive the housing 10 to vibrate at the same time, can also avoid excessive compression between the vibrator 12 and the housing 10 in vibration, and increase of the service life of the linear vibration motor. Compared with the existing technology, damping block is not required between the vibrator 12 and the housing 10, thereby the assembling steps between the vibrator 12 and the housing 10 are simplified effectively and the assembling efficiency is improved.

As the first permanent magnet 100 and the second permanent magnet 120 are separated, the vibrator 12 cannot touch directly the housing 10 in vibration and cannot make noise.

Preferably, the magnetic pole of the first permanent magnet 100 and the magnetic pole of the second permanent magnet 120 have the same polarity. The repulsive force between the first permanent magnet 100 and the second permanent magnet 120 is increased thereby, namely: the repulsive force between the first permanent magnet 100 and the second permanent magnet 120 is increased, the vibration amplitude between the vibrator 12 and the housing 10 is reduced effectively. The damping effect can be improved and the vibrator in vibration will not drive the housing 10 to vibrate.

Further, the first permanent magnet 100 can be fixed on the internal wall of the housing 10 by soldering or adhesive bonding in order to increase the connecting stability between the first permanent magnet 100 and the housing 10. The second permanent magnet 120 can be fixed on the side of the vibrator 12 by soldering or adhesive bonding, to increase the connecting stability between second permanent magnet 120 and the vibrator 12.

In one embodiment of the present application, the linear vibration motor also includes a drive module. The drive module includes a first magnet 121, a second magnet 122 and a coil, in which, the magnetic pole of the first magnet 121 face the magnetic pole with same polarity of the second magnet 122. The coil is wound on two adjacent ends of the first magnet 121 and the second magnet 122. As the magnetic pole of the first magnet 121 face the magnetic pole with same polarity of the second magnet 122, a repulsive force between the first magnet 121 and the second magnet 122 is created. The magnetic induction lines produced by the first magnet 121 and the magnetic induction lines produced by the second magnet 122 are relatively concentrated thereby. This proposal increases the density of magnetic induction lines passing through the coil and the utilization ratio of magnetic induction lines, and increases the magnetic force of the coil, namely, increases the driving force of the coil to drive the vibrator 12 to vibrate, and improves the vibration effect of the vibrator 12.

Preferably, the first magnet 121 is fixed with a first weight 125 at the end away from the second magnet 122 and the second magnet 122 is fixed with a second weight 126 at the end away from the first magnet 121. Two weights can increase the weight of the vibrator 12, improve the vibration effect of the vibrator 12.

Further, the first weight 125 and the second weight 126 are provided respectively with a first mounting groove and a second mounting groove, in which, the end of the first magnet 121 away from the second magnet 122 is inserted into the first mounting groove and the end of the second magnet 122 away from the first magnet 121 is inserted into the second mounting groove, for ensuring the connecting strength between the magnet and the weight.

In one embodiment of the present application, the vibrator 12 includes also a pole plate 127. This pole plate 127 is made of magnetic material and can be installed on the outside of the coil, or installed between two adjacent ends of the first magnet 121 and the second magnet 122. The pole plate 127 can concentrate the magnetic induction lines produced by the first magnet 121 and the magnetic induction lines produced by the second magnet 122 when passing though the coil, reduce the loss of the magnetic induction lines and improve the utilization rate of the magnetic induction lines, thereby increase the magnetic force of the coil, i.e. the driving force of the coil to drive the vibrator 12 to vibrate. The vibration effect of the vibrator 12 is improved.

Preferably, the coil includes a first coil 123 and a second coil 124. The coil 123 is wound on the first magnet 121 at one end adjacent to the second magnet 122 and the coil 124 is wound on the second magnet 122 at one end adjacent to the first magnet 121. This design can further reduce the loss of the magnetic induction lines and improve the utilization rate of the magnetic induction lines.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor including:
a housing;
an elastic connecting part connected with the housing;
a vibrator supported by the elastic connecting part and suspended in the housing;
a first permanent magnet positioned by an internal wall of the housing;
a second permanent magnet assembled with the vibrator and facing the first permanent magnet; wherein
the first permanent magnet and the second permanent magnet are separated from each other, the first permanent magnet and the second permanent magnet are such configured that the same polarities of the first and second permanent magnets face to each other for producing a repulsive force between the vibrator and the housing.

2. The linear vibration motor as described in claim 1, wherein the elastic connecting part includes a first connecting portion, a second connecting portion, and a third connecting portion connecting the first connecting portion to the second connecting portion, the elastic connecting part connects respectively the housing and the vibrator through the first connecting portion and the second connecting portion, and the third connecting portion is separated respectively with the housing and the vibrator.

3. The linear vibration motor as described in claim 1, wherein the vibrator includes a first magnet, a second magnet and a coil drive module, a magnetic pole of the first magnet face a magnetic pole of the second magnet with same polarity, the coil is wound on two adjacent ends of the first magnet and the second magnet.

4. The linear vibration motor as described in claim 3, wherein the vibrator further includes a first weight fixed on the first magnet at the end away from the second magnet and a second weight fixed on the second magnet at the end away from the first magnet.

5. The linear vibration motor as described in claim 4, wherein the first weight is provided with a first mounting groove, an end of the first magnet away from the second magnet is inserted into the first mounting groove, and/or,
the second weight is provided with a second mounting groove, an end of the second magnet away from the first magnet is inserted into the second mounting groove.

6. The linear vibration motor as described in claim 3, wherein the coil includes a first coil wound on the first magnet at the end adjacent to the second magnet and a second coil wound on the second magnet at the end adjacent to the first magnet.

* * * * *